United States Patent
Nowottnick et al.

(10) Patent No.: US 8,195,955 B2
(45) Date of Patent: Jun. 5, 2012

(54) METHOD FOR CRYPTOGRAPHIC AUTHENTICATION

(75) Inventors: Juergen Nowottnick, Hamburg (DE); Frank Boeh, Buchholz (DE)

(73) Assignee: NXP B.V., Eindhoven (NL)

( * ) Notice: Subject to any disclaimer, the term of this patent is extended or adjusted under 35 U.S.C. 154(b) by 571 days.

(21) Appl. No.: 12/302,610

(22) PCT Filed: May 16, 2007

(86) PCT No.: PCT/IB2007/051877
§ 371 (c)(1), (2), (4) Date: Nov. 26, 2008

(87) PCT Pub. No.: WO2007/138518
PCT Pub. Date: Dec. 6, 2007

(65) Prior Publication Data
US 2009/0158055 A1    Jun. 18, 2009

(30) Foreign Application Priority Data
May 30, 2006 (EP) .................................. 06114665

(51) Int. Cl.
*G06F 21/00* (2006.01)
(52) U.S. Cl. .................. 713/189; 713/185; 713/193
(58) Field of Classification Search .................. 713/189; 726/1–36
See application file for complete search history.

(56) References Cited

U.S. PATENT DOCUMENTS

| | | | | |
|---|---|---|---|---|
| 4,774,544 | A | * | 9/1988 | Tsuchiya et al. ............... 399/24 |
| 5,887,046 | A | * | 3/1999 | Bromley et al. ............... 377/39 |
| 6,687,325 | B1 | * | 2/2004 | Wells ............................. 377/26 |
| 6,798,695 | B2 | | 9/2004 | Boeh et al. |
| 7,039,844 | B2 | | 5/2006 | Hapke |
| 7,306,158 | B2 | | 12/2007 | Berardi et al. |
| 2007/0046428 | A1 | * | 3/2007 | Mamaloukas et al. ....... 340/5.61 |
| 2007/0101152 | A1 | * | 5/2007 | Mercredi et al. ............. 713/185 |

FOREIGN PATENT DOCUMENTS

| | | |
|---|---|---|
| DE | 10201553 A1 | 3/2003 |
| DE | 10201554 A1 | 8/2003 |
| EP | 1293938 A1 | 6/2002 |

OTHER PUBLICATIONS

Rankl, W., et al; "Handburch Der Chipkarten"; 2002, Hanser Verlag, Munchen, XP002459105; p. 212-216—see US Patent 7306158.

* cited by examiner

*Primary Examiner* — Vivek Srivastava
*Assistant Examiner* — Helai Salehi

(57) ABSTRACT

The invention relates to a method for cryptographic authentication in access security systems. The aim of the invention is to provide a software solution. To this end, the method for secured storage of counter states in a non-volatile memory (EEPROM) (10) involves an incrementing (11) process, and the current counter state is updated in only one EEPROM segment following each incrementing process (11), a subsequent access to the EEPROM (10) only being enabled in the event of a successful incrementing (11) of an EEPROM-based counter.

11 Claims, 1 Drawing Sheet

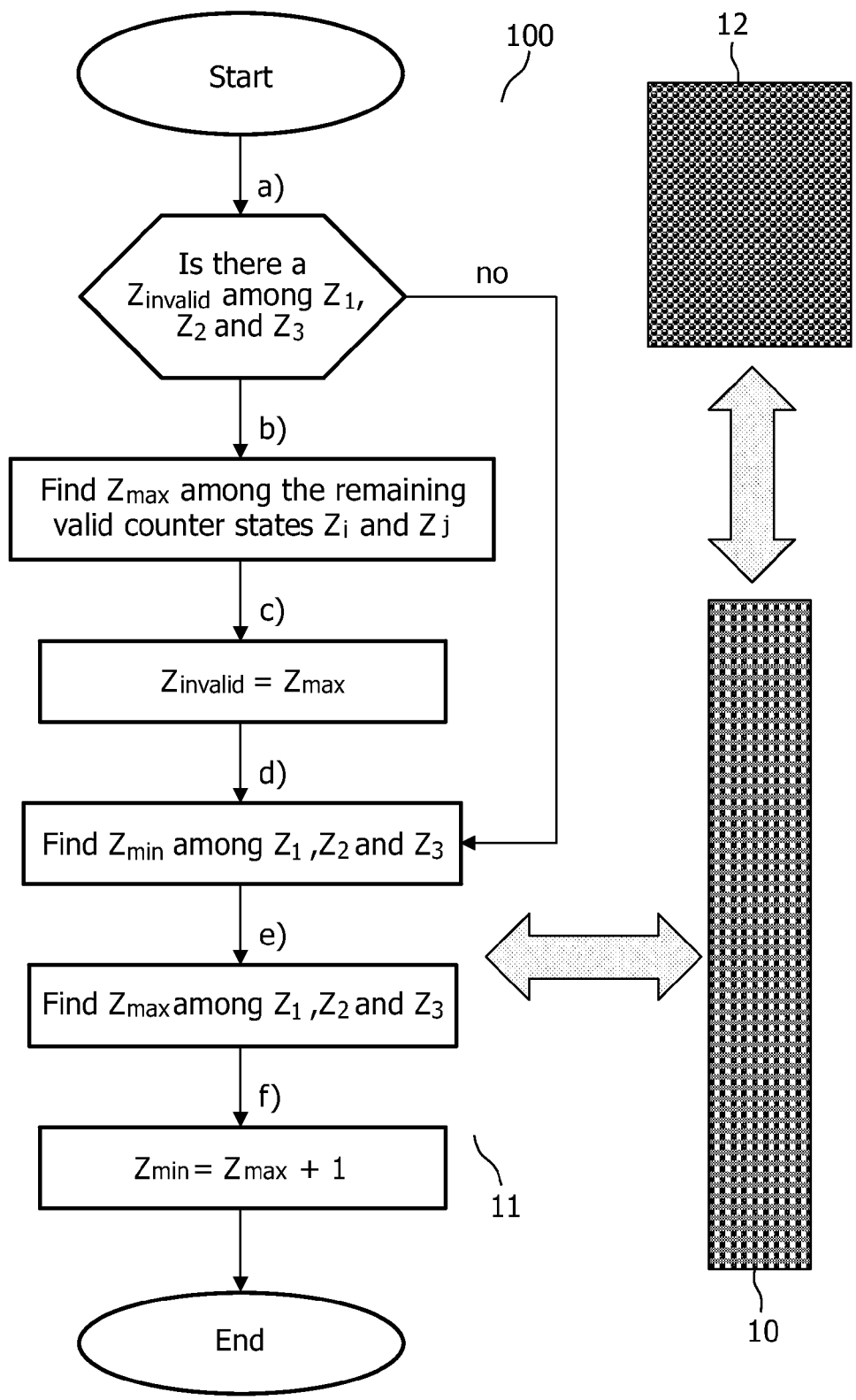

METHOD FOR CRYPTOGRAPHIC AUTHENTICATION

The invention relates to a method for cryptographic authentication in access security systems.

In access security systems for automotive technology in present-day state of the art technology so-called mutual authentication protocols are implemented, in which the calculation of cryptographic signatures is based not only on secret keys but also on random numbers, which calculation is exclusively provided by a base station. In transponders for automotive applications only the vehicle base station provides the single changeable component for the calculation of the cryptographic signatures.

In the field of chip cards random number generators, which are often based on special RC oscillators, are also supported on the card nowadays. Such realizations in access security systems for automotive applications are hardly conceivable among other things for reasons of cost control.

An advantage of a solution in which also the card or the transponder respectively, provides an ever changing number is the increased attack resistance to what is called replay attacks. With these attacks and their derivatives a non-authorized base station (attacker) could attempt to read secured information from the transponder or modify information in the EEPROM memory of the transponder while using recorded valid communication sequences.

The solutions known from the state of the art are not obtained, however, by the exclusive use of software. It is rather hardware-software solutions, which usually require special hardware.

Therefore, it is an object of the invention to provide a cryptographic authentication method which is based exclusively on a cryptographic algorithm, more particularly, in transponder systems.

This object is achieved by the characterizing features of claim 1.

It is a basic idea of the invention to provide an algorithm that is particularly useful in transponders for the cryptographic authentication. According to the invention this is thus not a hardware-software solution, for which also special hardware is to be used at all times. Compared to other methods this saves EEPROM accesses which are based on the storing of redundant information. Each of the EEPROM segments is then exclusively used for storing counter data. On many occasions this enables a counter-data-optimized write access to the EEPROM segments for further increasing the permitted number of write cycles. In addition, implementation of the method requires only little calculation effort. Neither is it necessary to use special hardware for reliable generation of a changing code, which is often easier to retrieve and, in addition, more expensive than the solution based on the EEPROM. The method according to the invention makes use of the characteristic properties of counter values for the integrated storing of these values and for error recognition and error correction. In this way also an effective protection against replay attacks is provided. Because of the fact that after each incrementation a new count is updated in only one EEPROM segment, the number of permitted program cycles may be triplicated compared with the methods known from the state of the art, while at the same time attacks on the security system are made more difficult.

An advantageous embodiment of the invention provides that the incrementation comprises the following steps:
a) retrieval of an invalid count in one of three EEPROM segments;
b) detection of a maximum valid count from the remaining valid counts if an invalid count exists;
c) overwriting of the invalid count with a valid count;
d) detection of a smallest valid count from the three valid counts, where in the absence of an invalid count, step d) follows step a);
e) detection of a largest valid count from the three valid counts;
f) overwriting of the smallest valid count with a valid maximum count.

The advantage of such incrementation resides in the fact that any redundant storage is avoided but nevertheless there is achieved that when invalid contents of a memory segment are detected, the counting rhythm is not disturbed since the very memory segment in which invalid contents are detected is rewritten and thus again valid counts are stored in all three memory segments on the basis of which counts counting may be resumed. Since, in addition, the memory segments are exclusively used for storing counts, these operations may be optimized and thus an increase of the permitted number of write cycles may be achieved.

Advantageously, in step a) the invalid count is determined as discussed in detail in DE 10201554 A1 via a calculation of the difference from the two remaining counts where the invalid count has the largest differences from the remaining counts.

It is advantageous that threshold values for the differences are defined from which a count is detected to be invalid. If the threshold value is exceeded, it may be assumed that the relevant memory segment contains an invalid stored value. With a known counting rate there is also known what mutual differences the stored values of the memory segments are allowed to have as a maximum. If larger differences, thus exceeding the threshold value, occur for a stored value of a memory segment, there may be assumed that this stored value is invalid. Therefore, there may be assumed already when the threshold value is exceeded that the relevant memory segment is immediately sellected for storing the new count.

A particularly advantageous embodiment of the invention provides that the count based on the EEPROM or a value derived from this count forms a changing initialization value for a suitable cryptoalgorithm which is to be used for the authentication and/or encryption of the communication with a transponder.

Within the spirit and scope of the invention it is at this point a given fact that for the calculation of the two cryptographic signatures (MAC and Response) both a changing value of a base station, which generates a signal called challenge, and a changing value from the transponder are taken into account. As a result it may be ensured that a crypto session cannot be carried out multiple times and in this way forms of the replay attack can be avoided. In addition, within the spirit and scope of the invention it is to be observed that—as has already been noted—only in the case of a successful execution of the INCREMENT command access is given to the user EEPROM. Each authentication sequence with ensuing EEPROM access can then be recorded only once, because another count has already been used for generating the cryptodata.

A practical variant of the invention provides that the counts used in the incrementation come from an up-counter or a down-counter.

The following description relating to the appended drawing, the whole given by way of non-limiting example, will provide better understanding of how the invention can be realized, in which.

FIG. 1 shows a sequence of operations for secured counting and storing in an EEPROM in respect of an incrementation.

FIG. 1 shows a method 100 according to the invention in which the three EEPROM segments $Z_1$, $Z_2$ and $Z_3$ are used for securedly storing consecutive counts. The method 100 according to the invention implies a sequence of operations for securedly counting and storing in an EEPROM 10 in the event of an incrementation 11, where the incrementation 11 is to be effected successfully in the application so as to subsequently come to a state in which an access (read, write) to the EEPROM 10 can be permitted, that is to say, only in the case of a successful execution of the INCREMENT command can access, i.e. read and write, be granted. In a first step a) an invalid count $Z_{valid}$ is searched for in one of three EEPROM segments, that is to say, a query is made as to whether there exists an invalid count $Z_{invalid}$ among the counts $Z_1$, $Z_2$ and $Z_3$. If such an invalid count $Z_{invalid}$ exists indeed, in a next step b) a maximum valid count is to be formed from the remaining valid counts $Z_i$ and $Z_j$ (i, j=1, 2, 3) if there exists an invalid count at all. The counter may in principle be an up-counter or a down-counter. In this example of embodiment it is assumed that it is a stepsize 1 up-counter. The invalid count in step a) is then determined via a calculation of the differences from the two remaining counts where an invalid count has the largest differences from the remaining counts. The memory value of such a memory segment is thus identified as being invalid and is overwritten with the new maximum count in step c). Thus this invalid count is removed from one of the memory segments of the EEPROM 10 and overwritten with a new valid count. If it is established that at this point no invalid count exists, in step d) a smallest valid count is chosen from the three valid counts while, in the event of non-existence of an invalid count, the method step d) follows immediately after method step a). Finally, in step e) a largest valid count is chosen from the three valid counts, so that in the subsequent step f) the smallest valid count can be overwritten with a valid maximum count.

The sequence of operations shown here for secured counting and storing in an EEPROM 10 loads the memory segments of the EEPROM 10 only to a limited extent, because each new count is stored in only one memory segment of the EEPROM 10 and, consequently, there is only a limited load on the EEPROM in respect of storing operations. In addition to this, since the differences are checked, there is a general check on the stored value so that in general the operational safety is enhanced. Thanks to the sequence of operations shown here the count based on the EEPROM or a value derived from this count forms a changing initialization value for a suitable cryptoalgorithm which serves to authenticate and/or encrypt the communication with a transponder 12. The method according to the invention thus provides a pure software solution which can be used for systems in which a high degree of cryptographic security is a must. Fields of application are particularly transponders 12.

REFERENCE LIST 100 method card
10 EEPROM
11 incrementation
12 transponder

The invention claimed is:

1. A method for cryptographic authentication in an access security system, the method comprising:
   incrementing consecutive counts in segments of an Electrically Erasable Programmable Read-Only Memory (EEPROM) by;
   retrieving an invalid count in one of three EEPROM segments;
   detecting a maximum valid count from two remaining valid counts if an invalid count exists;
   overwriting the invalid count with the maximum valid count;
   when no invalid count exists, detecting a smallest valid count from three valid counts, wherein detecting the smallest valid count follows the retrieving step;
   detecting a largest valid count from the three valid counts; and
   overwriting the smallest valid count with the largest valid count, wherein the cryptographic authentication occurs after each successful execution of the incrementing step; and
   after each incrementation, updating a current count in not more than one EEPROM segment to produce an updated counter value; and
   using each updated counter value as a changing initialization value in subsequent cryptographic authentications.

2. The method as claimed in claim 1, wherein the access security system is a transponder.

3. The method as claimed in claim 1, further comprising: determining the invalid count via a calculation of differences from the two remaining valid counts, where the invalid count has the largest difference from the two remaining valid counts.

4. The method as claimed in claim 1, further comprising: forming, with the EEPROM-based count, a changing initialization value for a suitable cryptoalgorithm which serves to authenticate communication with the transponder.

5. The method as claimed in claim 1, further comprising: producing the consecutive counts in the event of each incrementation by an up-counter or a down-counter.

6. The method of claim 1, further comprising:
   storing each new count in only one EEPROM segment.

7. The method of claim 1, further comprising: recording each authentication sequence with ensuing EEPROM access only once.

8. The method as claimed in claim 1, further comprising: using a known counting rate to detect the invalid count.

9. The method of claim 1, further comprising: calculating two cryptographic signatures based upon both a changing value from a base station and a changing value from the access security system.

10. The method as claimed in claim 3, further comprising: defining threshold values for the differences from which a count is detected to be invalid.

11. The method of claim 5, wherein the up-counter is a stepsize up-counter.

* * * * *